US012738641B2

(12) United States Patent
Hong et al.

(10) Patent No.: US 12,738,641 B2
(45) Date of Patent: Sep. 15, 2026

(54) ELECTRONIC DEVICE INCLUDING ANTENNA AND ANTENNA CONTROL METHOD

(71) Applicants: SAMSUNG ELECTRONICS CO., LTD., Suwon-si (KR); POSTECH RESEARCH AND BUSINESS DEVELOPMENT FOUNDATION, Pohang-si (KR)

(72) Inventors: Wonbin Hong, Pohang-si (KR); Sumin Yun, Suwon-si (KR); Jaehoon Jo, Suwon-si (KR); Dongkwon Choi, Pohang-si (KR); Hosaeng Kim, Suwon-si (KR)

(73) Assignees: SAMSUNG ELECTRONICS CO., LTD., Suwon-si (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 276 days.

(21) Appl. No.: 18/482,415

(22) Filed: Oct. 6, 2023

(65) Prior Publication Data

US 2024/0039151 A1 Feb. 1, 2024

Related U.S. Application Data

(63) Continuation of application No. PCT/KR2022/004847, filed on Apr. 5, 2022.

(30) Foreign Application Priority Data

Apr. 9, 2021 (KR) ........................ 10-2021-0046386

(51) Int. Cl.
*H01Q 3/00* (2006.01)
*H01Q 3/26* (2006.01)
(Continued)

(52) U.S. Cl.
CPC ............... *H01Q 3/26* (2013.01); *H01Q 3/385* (2013.01); *H01Q 3/40* (2013.01); *H01Q 21/06* (2013.01); *H01Q 23/00* (2013.01)

(58) Field of Classification Search
CPC ............ H01Q 3/26; H01Q 3/40; H01Q 3/385; H01Q 21/06; H01Q 21/245; H01Q 21/061
(Continued)

(56) References Cited

U.S. PATENT DOCUMENTS 4,772,893 A * 9/1988 Iwasaki ................ H01Q 3/2658 343/777
9,030,364 B2 * 5/2015 Zhuang .................... H01Q 5/50 343/770
(Continued)

FOREIGN PATENT DOCUMENTS

CN 207691005 U 8/2018
CN 107181516 2/2021
(Continued)

OTHER PUBLICATIONS

International Search Report for PCT/KR2022/004847 mailed Jul. 15, 2022, 4 pages.
(Continued)

*Primary Examiner* — Chuong P Nguyen
(74) *Attorney, Agent, or Firm* — Nixon & Vanderhye, P.C.

(57) ABSTRACT

An example electronic device may include a memory; a processor; a communication circuit; an input/output expander (I/O expander); and an array antenna. The processor may control to store an input/output table in the memory and to radiate an RF signal through the array antenna based on the input/output table.

15 Claims, 10 Drawing Sheets

(51) Int. Cl.
*H01Q 3/38* (2006.01)
*H01Q 3/40* (2006.01)
*H01Q 21/06* (2006.01)
*H01Q 23/00* (2006.01)

(58) Field of Classification Search
USPC .................................................. 342/368, 372
See application file for complete search history.

(56) References Cited

U.S. PATENT DOCUMENTS

| | | | | |
|---|---|---|---|---|
| 9,490,548 | B2 | 11/2016 | Weissman et al. | |
| 10,211,516 | B2 * | 2/2019 | Soh | H01Q 5/371 |
| 10,381,745 | B2 | 8/2019 | Geng et al. | |
| 11,158,945 | B2 * | 10/2021 | Tokgoz | H01Q 21/24 |
| 12,119,533 | B2 * | 10/2024 | Pijl | H01P 5/16 |
| 2008/0102760 | A1 | 5/2008 | McConnell et al. | |
| 2010/0045557 | A1 | 2/2010 | Park et al. | |
| 2015/0200455 | A1 * | 7/2015 | Venkateswaran | H01Q 1/246 342/372 |
| 2016/0173164 | A1 | 6/2016 | Kim et al. | |
| 2017/0237150 | A1 | 8/2017 | Soh et al. | |
| 2018/0175506 | A1 | 6/2018 | Park et al. | |
| 2020/0014443 | A1 | 1/2020 | Kuwabara | |
| 2020/0021138 | A1 | 1/2020 | Yeo et al. | |

FOREIGN PATENT DOCUMENTS

| | | | |
|---|---|---|---|
| JP | 4170932 | 10/2008 | |
| JP | 2010-506465 | 2/2010 | |
| JP | 6682413 | 4/2020 | |
| KR | 10-2010-0022374 | 3/2010 | |
| KR | 10-1686904 | 12/2016 | |
| KR | 10-2017-0096771 | 8/2017 | |
| KR | 10-2018-0097111 | 8/2018 | |
| KR | 10-1937820 | 1/2019 | |
| WO | WO-0068803 A1 * | 11/2000 | H04B 1/0003 |
| WO | WO-2018155881 A1 * | 8/2018 | H02J 50/23 |
| WO | WO-2021251515 A1 * | 12/2021 | H01Q 21/06 |

OTHER PUBLICATIONS

Written Opinion of the ISA for PCT/KR2022/004847 mailed Jul. 15, 2022, 5 pages.

Kim, J. S et al, “A multiple beam management scheme on 5G mobile communication systems for supporting high mobility,” 2016 International Conference on Information Networking (ICOIN), Kota Kinabalu, 2016, pp. 260-264.

Hong, W. et al, “Quantitative analysis of the effects of polarization and pattern reconfigureation for mmWave 5G mobile antenna prototypes,” 2017 IEEE Radio and Wireless Symposium (RWS), Phoenix, AZ, 2017, pp. 68-71.

Sadhu, B. et al, “A 28-GHz 32-Element TRX Phased-Array IC With Concurrent Dual-Polarized Operation and Orthogonal Phase and Gain Control for 5G Communications,” in IEEE Journal of Solid-State Circuits, vol. 52, No. 12, pp. 3373-3391, Dec. 2017.

Hong, W. et al, Baek and S. Ko, “Millmeter-Wave 5G Antennas for Smartphones: Overview and Experimental Demonstration,” in IEEE Transactions on Antennas and Propagation, vol. 65, No. 12, pp. 6250-6261, Dec. 2017.

Xia, H. et al, “A low-cost dual-polarized 28 GHz phased array antenna for 5G communications,” 2018 Intenational Workshop on Antenna Technology (iWAT), Nanjing, 2018, pp. 1-4.

Source: Analog Device (https://semiengineering.com/5g-heats-up-base-stations/), May 7, 2019, 15 pages.

Hill, T.A. et al,: ‘28 GHz Taylor feed network for side lobe level reduction in 5G phased array antennas’, Microw. Opt. Technol. Lett., 2018, 61, (1), pp. 1-7.

Alhalabi, R. A. et al, “High-Efficiency Angled-Dipole Antennas for Millimeter-Wave Phased Array Applications,” in IEEE Trans. on Antennas and Propagation, vol. 56, No. 10, pp. 3136-3142, Oct. 2008.

Pandey, A. K, “Design of a compact high power phased array for 5G FD-MIMO system at 29 GHz,” 2016 Asia-Pacific Microwave Conference (APMC), New Delhi, 2016., 4 pages.

Park, J. et al A Software-Programmable Directivity, Beamsteering, and Polarization Reconfigurable Block Cell Antenna Concept for Millimeter-Wave 5G Phased-Array Architectures, (IEEE Transactions on Antennas and Propagation, vol. 69, No. 1, Jan. 2021).

Choo, M. et al. “28 GHz Pattern Reconfigurable Block Cell Antenna featuring Electrically Small Profile” IEEE ISAP, Oct. 26, 2018, 4 pages.

Office Action dated May 1, 2025 in Korean Patent Application No. 10-2021-0046386 and English-language translation.

Office Action dated Jan. 6, 2026 in Korean Application No. 10-2021-0046386 with English translation.

* cited by examiner

ELECTRONIC DEVICE INCLUDING ANTENNA AND ANTENNA CONTROL METHOD

CROSS-REFERENCE TO RELATED APPLICATIONS

This application is a continuation of PCT/KR2022/004847, designating the United States, filed Apr. 5, 2022, in the Korean Intellectual Property Receiving Office, which claims priority to Korean Patent Application No. 10-2021-0046386, filed on Apr. 9, 2021, in the Korean Intellectual Property Office. The contents of each of these applications are incorporated by reference herein in their entireties.

BACKGROUND

Field

The disclosure relates to an electronic device including an antenna and a method for controlling the antenna.

Description of Related Art

Electronic devices capable of wireless communication are increasing. The electronic device may support a communication system using various frequency ranges.

For example, an electronic device including a 5G communication system may include a beamforming technology and a dual-polarized radiation technology for transmitting and receiving signals in a desired direction to improve the quality of the communication channel.

The electronic device may include an antenna including a plurality of input/output ports to implement beamforming technology and dual-polarized radiation technology.

SUMMARY

In a case of communicating through multiple input/output ports, communication circuits may become more complex, manufacturing costs may increase, and/or performance may deteriorate.

Electronic devices and antenna control methods including antennas according to various embodiments of the present disclosure may support multiple input/output ports while reducing the complexity of antennas and communication circuits using passive devices.

The technical tasks to be accomplished in the present disclosure are not limited to the above-mentioned technical tasks, and other technical tasks not mentioned can be clearly understood from the following description.

An electronic device according to various embodiments of the present disclosure may include a memory; a processor; a communication circuit; an input/output expander (I/O expander); and an array antenna, wherein the processor may control to store an input/output table in the memory and to radiate an RF signal through the array antenna based on the input/output table.

A method of controlling an antenna of an electronic device including a processor and a memory according to various embodiments of the present disclosure may include controlling, by the processor, to store an input/output table in the memory and radiating an RF signal through an antenna based on the input/output table.

In various embodiments of the present disclosure, an electronic device including an antenna and an antenna control method may reduce the complexity of the communication circuit by increasing the output port relative to the input port.

In various embodiments of the present disclosure, an electronic device including an antenna and an antenna control operation may provide beamforming and polarized radiation.

In addition, various effects that are directly or indirectly identified through various embodiments of the present disclosure may be provided.

BRIEF DESCRIPTION OF THE DRAWINGS

The above and/or other aspects of the disclosure will be more apparent by describing certain embodiments of the disclosure with reference to the accompanying drawings, in which.

In connection with the description of the drawings, the same or similar reference numerals may be used for the same or similar components.

DETAILED DESCRIPTION

Figure 1:
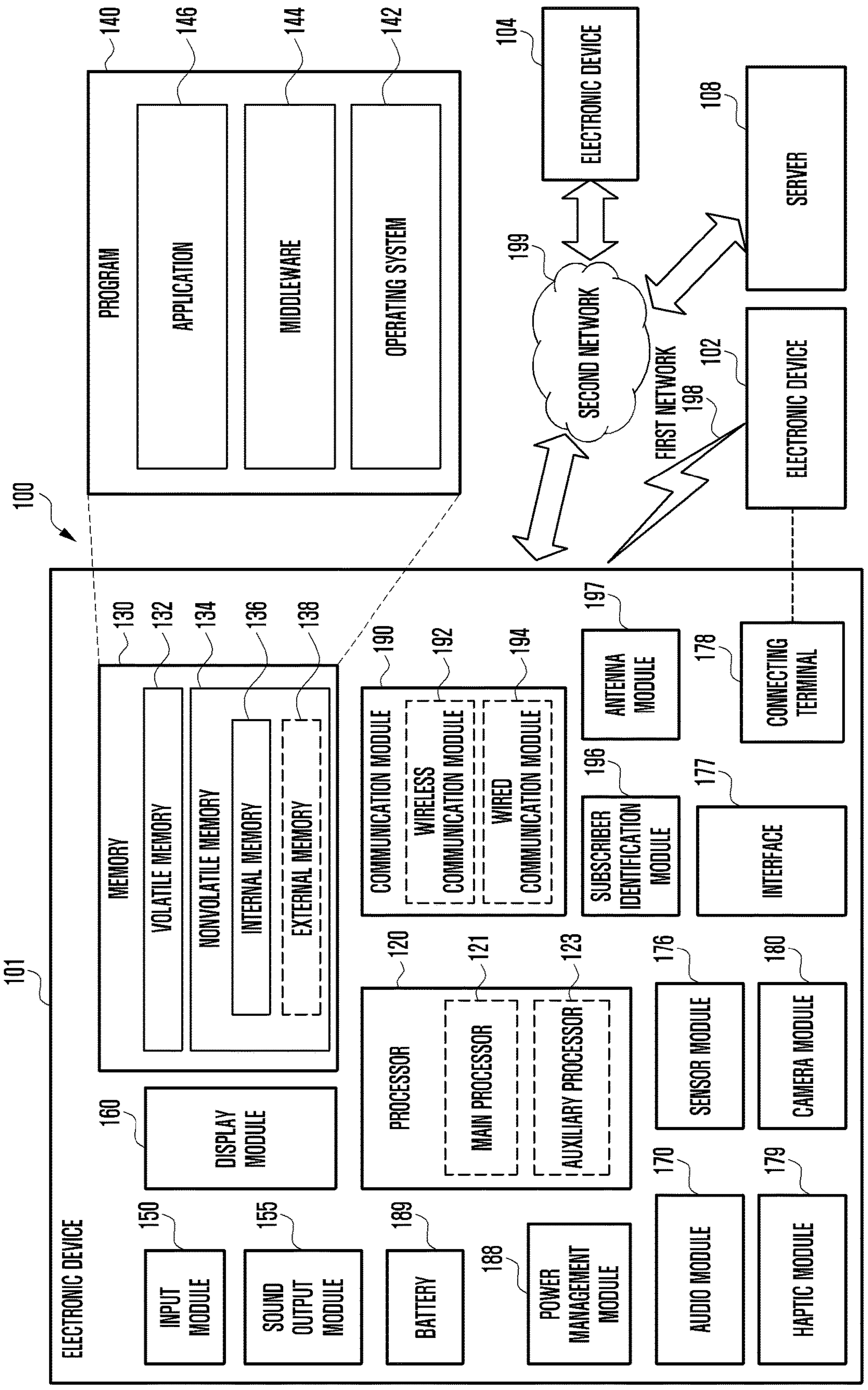
FIG. 1 is a block diagram of an example electronic device in a network environment according to various embodiments.

FIG. 1 is a block diagram of an example electronic device 101 in a network environment 100 according to an embodiment.

With reference to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments of the disclosure, at least one (e.g., the connection terminal 178) of the components may be omitted from the electronic device 101, or one or more other components may be added in the electronic device 101. In various embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a $5^{th}$ generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input/output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In an embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

Figure 2:
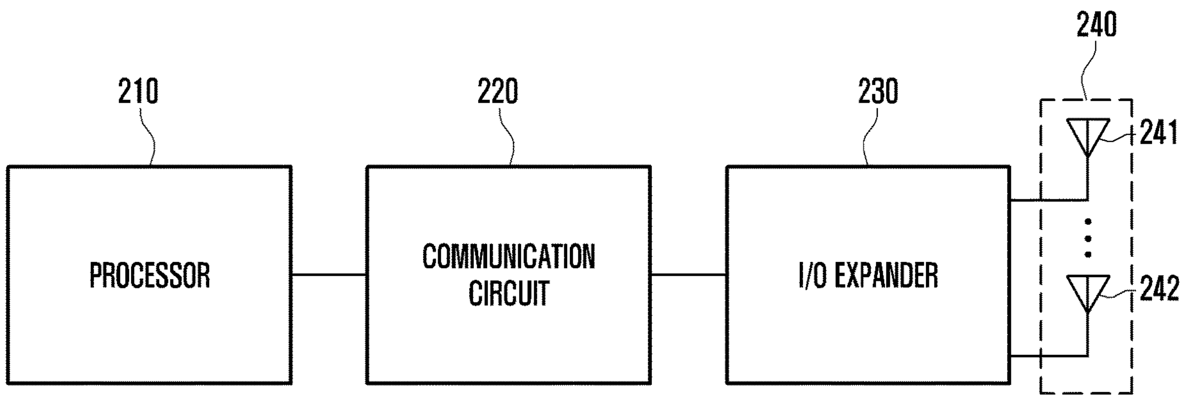
FIG. 2 is a block diagram illustrating an example electronic device including an antenna according to various embodiments.

FIG. 2 is a block diagram illustrating an example electronic device 101 including an antenna according to various embodiments of the present disclosure.

The electronic device 101 may include a processor 210 (e.g., the processor 120 of FIG. 1), a communication circuit 220, an input/output expander (I/O expander) 230, and/or an array antenna 240.

In various embodiments, the processor 210 (including, e.g., processing circuitry) may include a communication processor. The processor 210 may support the establishment of a communication channel of a band to be used for wireless communication and the network communication through the established communication channel. For example, the processor 210 may support a 5G network communication.

According to various embodiments, the processor 210 may be formed within a single chip or a single package with the communication circuit 220, the input/output expander (I/O expander) 230, and/or the array antenna 240.

In various embodiments, the communication circuit 220 may convert the baseband signal generated by the processor 210 into a radio frequency (RF) signal used in the network (e.g., a 5G network) at the time of transmission. Upon receiving, the communication circuit 220 may acquire an RF signal from a network (e.g., a 5G network) via an antenna (e.g., array antenna 240) and preprocess it.

In various embodiments, the communication circuit 220 may include a transceiver and/or a radio frequency front end (RFFE).

In various embodiments, the communication circuit 220 may convert the RF signal or the preprocessed RF signal into a baseband signal so that it can be processed by the processor 210. In various embodiments, the communication circuit 220 may be an IC capable of steering a phased array beam.

In various embodiments, the communication circuit 220 may convert the RF signal received from the input/output expander 230 into a baseband signal and transmit it to the processor 120.

In various embodiments, the input/output expander (I/O expander) 230 may, for example, include a divider and a coupler. The input/output expander 230 may transmit RF signals transmitted through the communication circuit 220 to the array antenna 240.

In various embodiments, the input/output expander 230 may include an input port and an output port. The input port of the input/output expander 230 may be connected to the communication circuit 220. The input port of the input/output expander 230 may receive a signal output from the communication circuit 220. The output port of the input/output expander 230 may be connected to the array antenna 240.

In various embodiments, the input/output expander 230 may divide and/or couple signals input from the communication circuit 220 using a divider and a coupler to transmit to the array antenna 240.

In various embodiments, the electronic device 101 may store data of an output signal relative to an input signal divided and/or coupled in the input/output expander 230 in the memory 130.

The array antenna 240 may include a plurality of antennas 241 and 242. The array antenna 240 may receive or radiate an RF signal.

Figure 3:
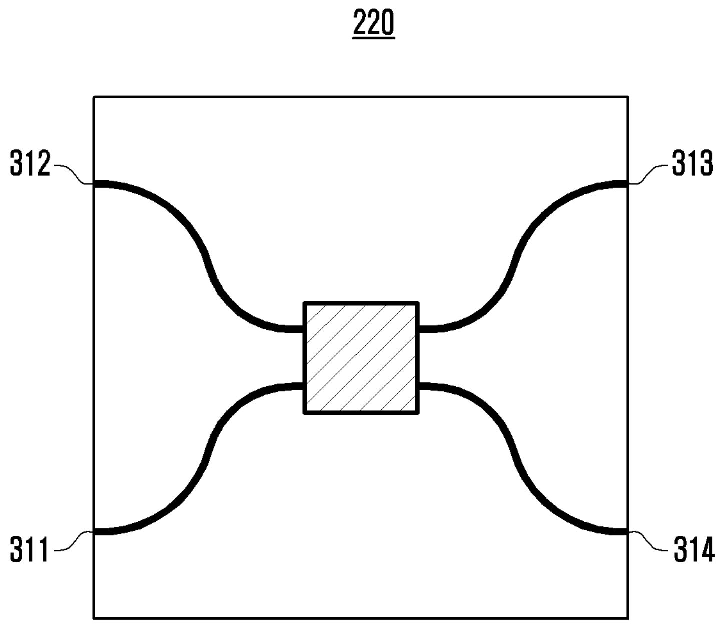
FIG. 3 is a diagram illustrating an example communication circuit according to various embodiments.

FIG. 3 is a diagram illustrating an example communication circuit 220 according to various embodiments of the present disclosure.

The communication circuit 220 may include a plurality of ports 311, 312, 313, and 314. A plurality of ports 311, 312, 313, and 314 may be connected to the input/output expander 230.

In various embodiments, the communication circuit 220 may convert the baseband signal received from the processor 210 into an RF signal and output it to a plurality of ports 311, 312, 313, and 314. The communication circuit 220 may transmit RF signals output to the plurality of ports 311, 312, 313, and 314 to the input/output expander 230. The communication circuit 220 may convert RF signals input to a plurality of ports 311, 312, 313, and 314 into baseband signals and transmit them to the processor 210.

Figure 4:
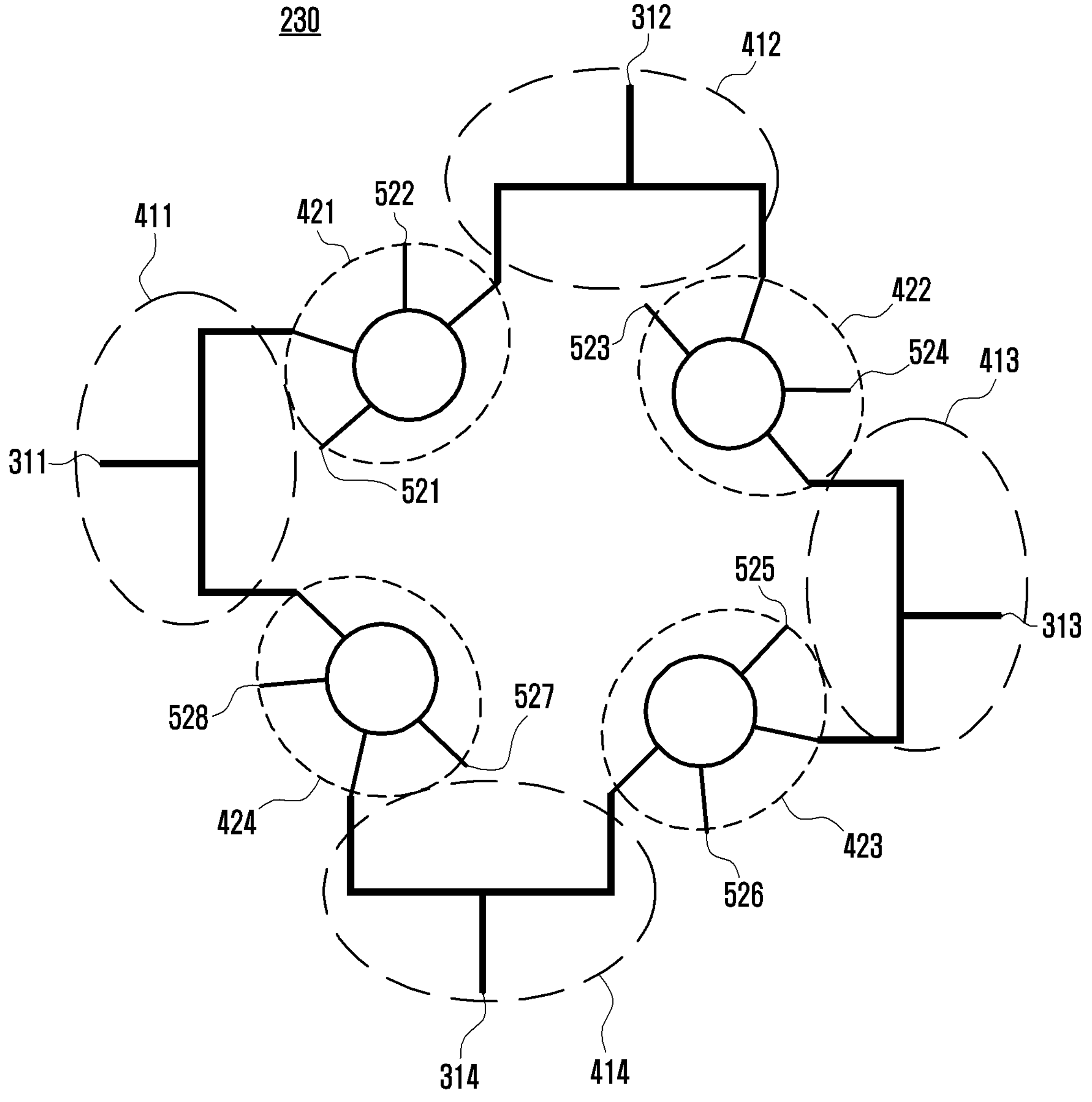
FIG. 4 is a diagram illustrating an example input/output expander according to various embodiments.

FIG. 4 is a diagram illustrating an example input/output expander 230 according to various embodiments of the present disclosure.

In various embodiments, the input/output expander 230 may include a plurality of dividers 411, 412, 413, and 414 and a plurality of couplers 421, 422, 423, and 424. A plurality of dividers 411, 412, 413, and 414 and a plurality of couplers 421, 422, 423, and 424 may be cross-arranged in a chain structure. For example, the first coupler 421 may be connected between the first divider 411 and the second divider 412. A second coupler 422 may be connected between the second divider 412 and the third divider 413. A third coupler 423 may be connected between the third divider 413 and the fourth divider 414. A fourth coupler 424 may be connected between the fourth divider 414 and the first divider 411.

In various embodiments, the first divider 411 may be connected to the first port 311. The second divider 412 may be connected to the second port 312. The third divider 413 may be connected to the third port 313. The fourth divider 414 may be connected to the fourth port 314.

In various embodiments, the first coupler 421 may be connected to the first divider 411 and the second divider 412 to receive an input signal transmitted from the communication circuit 220 and output it to a plurality of output ports. The first coupler 421 may be a rat-race coupler.

In various embodiments, the second coupler 422 may be connected to the second divider 412 and the third divider 413 to receive an input signal transmitted from the communication circuit 220 and output it to a plurality of output ports. The second coupler 422 may be a rat-race coupler.

In various embodiments, the third coupler 423 may be connected to the third divider 413 and the fourth divider 414 to receive an input signal transmitted from the communication circuit 220 and output it to a plurality of output ports. The third coupler 421 may be a rat-race coupler.

In various embodiments, the fourth coupler 424 may be connected to the fourth divider 414 and the first divider 411 to receive an input signal transmitted from the communication circuit 220 and output it to a plurality of output ports. The fourth coupler 424 may be a rat-race coupler.

In various embodiments, the first coupler 421 may include a first output port 521 and a second output port 522. The first output port 521 and the second output port 522 may be connected to the first antenna 511 of FIG. 5. The second coupler 422 may include a third output port 523 and a fourth output port 524. The third output port 523 and the fourth output port 524 may be connected to the second antenna 512 of FIG. 5. The third coupler 423 may include a fifth output port 525 and a sixth output port 526. The fifth output port 525 and the sixth output port 526 may be connected to the third antenna 513 of FIG. 5. The fourth coupler 424 may include a seventh output port 527 and an eighth output port 528. The seventh output port 527 and the eighth output port 528 may be connected to the fourth antenna 514 of FIG. 5.

Figure 5:
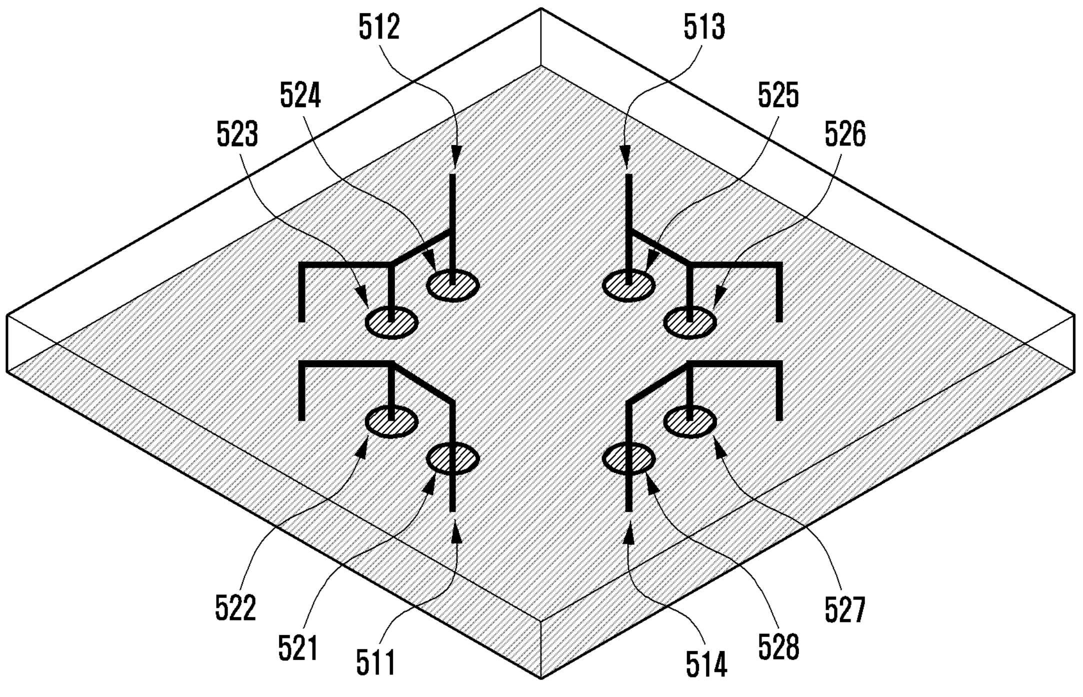
FIG. 5 is a diagram illustrating a state in which the input/output expander of FIG. 4 and a plurality of antennas are coupled.

FIG. 5 is a diagram illustrating a state in which the input/output expander 230 of FIG. 4 and a plurality of antennas are coupled.

In various embodiments, the first coupler 421 may be connected to the first divider 411 and the second divider 412, receive an input signal transmitted from the communication circuit 220, and output it to a plurality of output ports 521 and 522. The first output port 521 and the second output port 522 may be connected to the first antenna 511. The first antenna 511 may be connected to the first output port 521 and the second output port 522 and radiate an RF signal. The first antenna 511 may be connected to the first output port 521 and the second output port 522 and receive an RF signal.

In various embodiments, the second coupler 422 may be connected to the second divider 412 and the third divider 413, receive an input signal transmitted from the communication circuit 220, and output it to a plurality of output ports 523 and 524. The third output port 523 and the fourth output port 524 may be connected to the second antenna 512. The second antenna 512 may be connected to the third output port 523 and the fourth output port 524 and radiate an RF signal. The second antenna 512 may be connected to the third output port 523 and the fourth output port 524 and receive an RF signal.

In various embodiments, the third coupler 423 may be connected to the third divider 413 and the fourth divider 414, receive an input signal transmitted from the communication circuit 220, and output it to a plurality of output ports 525 and 526. The fifth output port 525 and the sixth output port 526 may be connected to the third antenna 513. The third antenna 513 may be connected to the fifth output port 525 and the sixth output port 526 and radiate an RF signal. The third antenna 513 may be connected to the fifth output port 525 and the sixth output port 526 and receive an RF signal.

In various embodiments, the fourth coupler 424 may be connected to the second divider 412 and the third divider 413, receive an input signal transmitted from the communication circuit 220, and output it to a plurality of output ports 527 and 528. The seventh output port 527 and the eighth output port 528 may be connected to the fourth antenna 514. The fourth antenna 514 may be connected to the seventh output port 527 and the eighth output port 528 and radiate an RF signal. The fourth antenna 514 may be connected to the seventh output port 527 and the eighth output port 528 and receive an RF signal.

Figure 6:
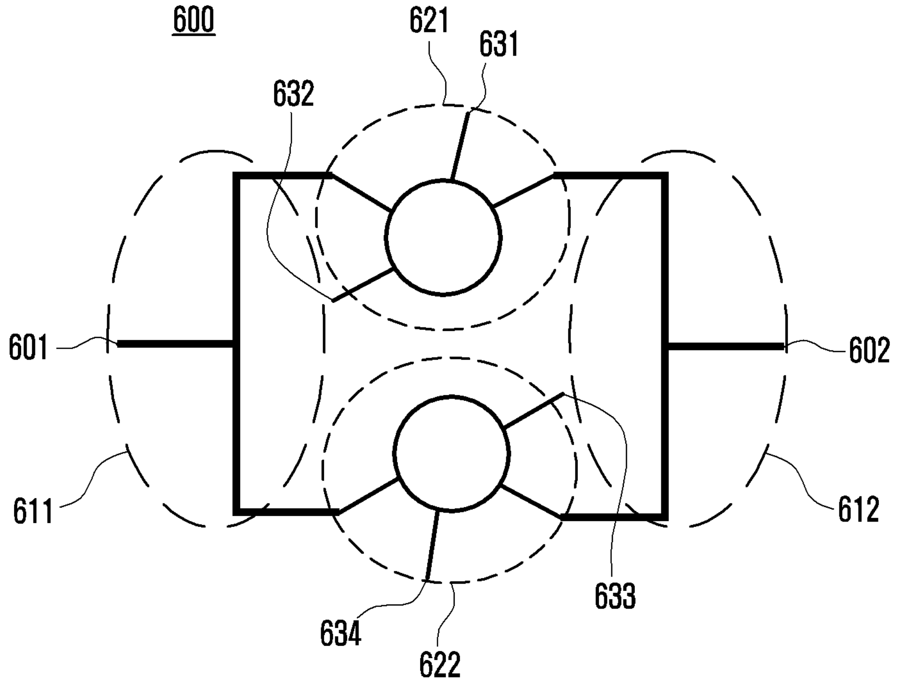
FIG. 6 is a diagram illustrating an example input/output expander according to various embodiments.

FIG. 6 is a diagram illustrating an example input/output expander 600 according to various embodiments of the present disclosure.

In various embodiments, the input/output expander 600 may include a fifth divider 611, a sixth divider 612, a fifth coupler 621, and a sixth coupler 622.

In various embodiments, the fifth divider 611, the sixth divider 612, the fifth coupler 621, and the sixth coupler 622 may be cross-arranged in a chain structure. For example, the fifth coupler 621 and the sixth coupler 622 may be connected between the fifth divider 611 and the sixth divider 612.

In various embodiments, the fifth divider 611 may be connected to the fifth port 601. The sixth divider 612 may be connected to the sixth port 602.

In various embodiments, the fifth coupler 621 may be connected to the fifth divider 611 and the sixth divider 612, receive an input signal transmitted from the communication circuit 220, and output it to a plurality of output ports.

In various embodiments, the sixth coupler 622 may be connected to the fifth divider 611 and the sixth divider 612, receive an input signal transmitted from the communication circuit 220, and output it to a plurality of output ports.

For example, the fifth coupler 621 and the sixth coupler 622 may be rat-race couplers.

In various embodiments, the fifth coupler 621 may be connected to the fifth divider 611 and the sixth divider 612, receive an input signal transmitted from the communication circuit 220, and output it to a plurality of output ports.

In various embodiments, the sixth coupler 622 may be connected to the fifth divider 611 and the sixth divider 612, receive an input signal transmitted from the communication circuit 220, and output it to a plurality of output ports.

In various embodiments, the fifth coupler 621 may include a ninth output port 631 and a tenth output port 632. The ninth output port 631 and the tenth output port 632 may be connected to an antenna. The sixth coupler 622 may include an eleventh output port 633 and a twelfth output port 634. The eleventh output port 633 and the twelfth output port 634 may be connected to an antenna.

In various embodiments, the input signal transmitted from the communication circuit 220 may be transmitted to the fifth port 601 and the sixth port 602. Signals input to the fifth port 601 and the sixth port 602 may be output through the ninth output port 631, the tenth output port 632, the eleventh output port 633, and the twelfth output port 634. The signal output through the ninth output port 631, the tenth output port 632, the eleventh output port 633, and the twelfth output port 634 may differ in the output value because of the phase difference of the input signal value. Thereby, the features of the antenna connected to the ninth output port 631, the tenth output port 632, the eleventh output port 633, and the twelfth output port 634 may be adjusted.

In various embodiments, the input/output relationship between the signal input to the fifth port 601 and the sixth port 602 and the signal output through the ninth output port 631, the tenth output port 632, the eleventh output port 633, and the twelfth output port 634 may be shown in Table 1. The signal input to the fifth port 601 may be a first input signal, and the signal input to the sixth port 602 may be a second input signal.

TABLE 1

| [Ninth output port 631, tenth output port 632] [Eleventh output port 633, twelfth output port 634] | | Sixth port 602 - Second input signal | | |
|---|---|---|---|---|
| | | X | 1 ∠ 0 | 1 ∠ π |
| Fifth port (601) - First input signal | X | [X, X] | [1/2 ∠ π/2, 1/2 ∠ −π/2] | [1/2 ∠ −π/2, 1/2 ∠ π/2] |
| | | [X, X] | [1/2 ∠ −π/2, 1/2 ∠ −π/2] | [1/2 ∠ π/2, 1/2 ∠ π/2] |
| | 1 ∠ 0 | [1/2 ∠ −π/2, 1/2 ∠ −π/2] | [X, 2 ∠ −π/2] | [2 ∠ −π/2, X] |
| | | [1/2 ∠ π/2, 1/2 ∠ −π/2] | [X, 2 ∠ −π/2] | [2 ∠ π/2, X] |
| | 1 ∠ π | [1/2 ∠ π/2, 1/2 ∠ π/2] | [2 ∠ π/2, X] | [X, 2 ∠ π/2] |
| | | [1/2 ∠ −π/2, 1/2 ∠ π/2] | [2 ∠ −π/2, X] | [X, 2 ∠ π/2] |

With reference to Table 1, the rat-race coupler may have a different output value because of the phase difference of the input signal value.

Figure 7:
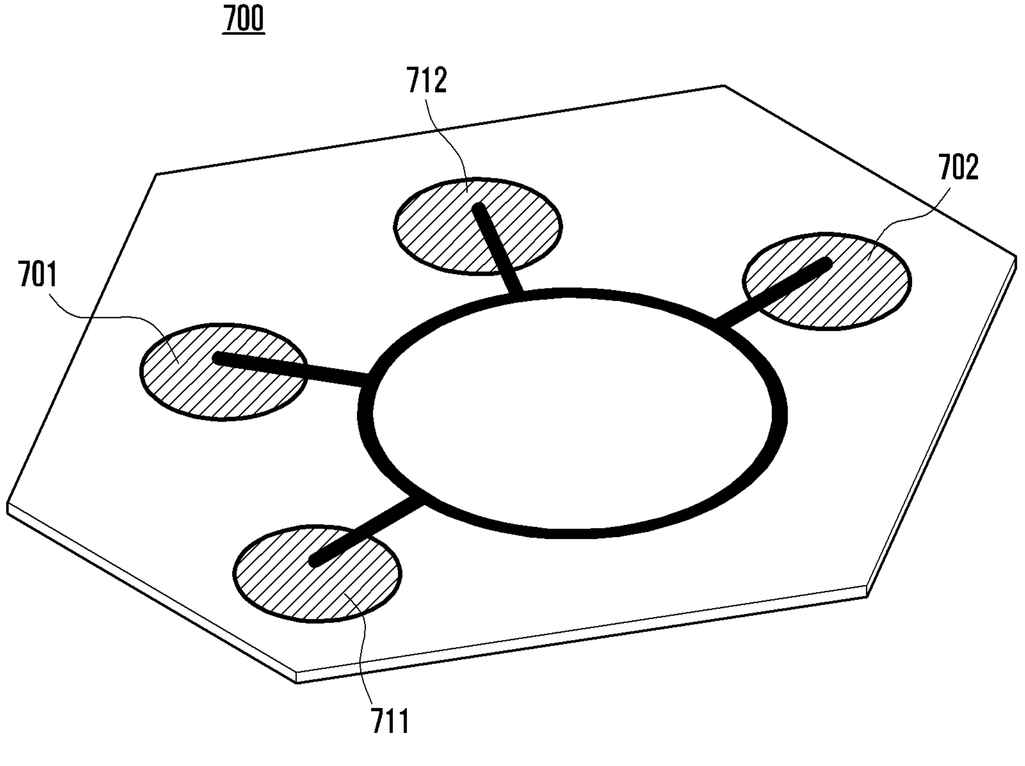
FIG. 7 is a diagram illustrating an example rat-race coupler according to various embodiments.

FIG. 7 is a diagram illustrating an example rat-race coupler 700 according to various embodiments of the present disclosure.

The rat-race coupler 700 may include a plurality of ports 701, 702, 711, and 712. The rat-race coupler 700 may include a plurality of input ports 701 and 702 and/or a plurality of output ports 711 and 712.

Figure 8:
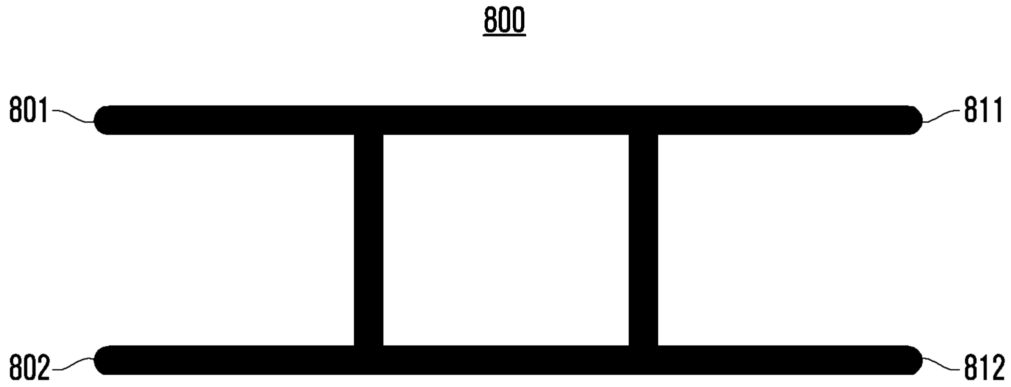
FIG. 8 is a diagram illustrating an example quadrature coupler according to various embodiments.

FIG. 8 is a diagram illustrating an example quadrature coupler 800 according to various embodiments of the present disclosure.

The quadrature coupler 800 may include a plurality of ports 801, 802, 811, and 812. The quadrature coupler 800 may include a plurality of input ports 801 and 802 and/or a plurality of output ports 811 and 812.

Figure 9:
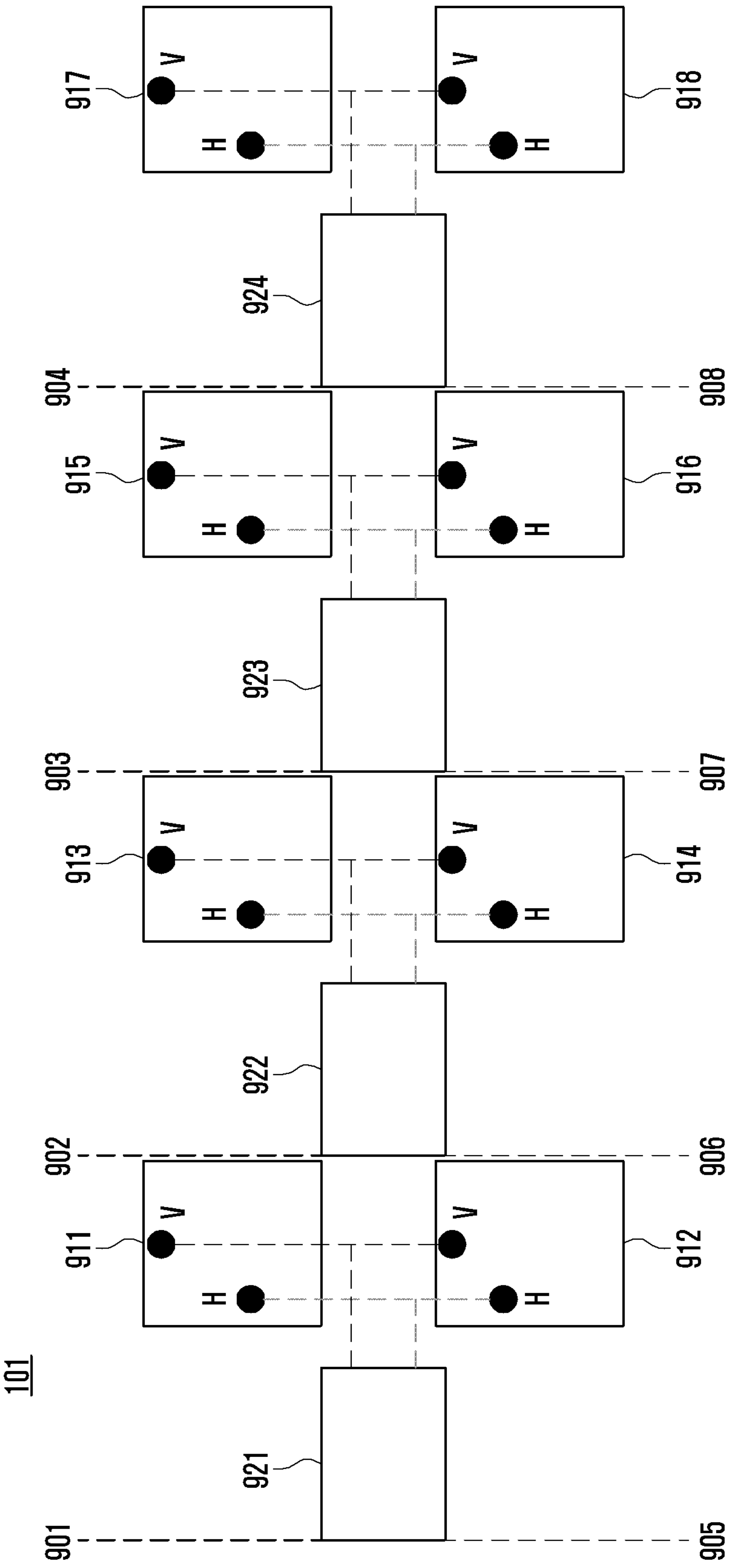
FIG. 9 is a diagram illustrating a plurality of example input/output expanders and a plurality of example antennas of an example electronic device according to various embodiments.

FIG. 9 is a diagram illustrating a plurality of example input/output expanders and a plurality of example antennas of the electronic device 101 according to various embodiments of the present disclosure.

The electronic device 101 may include a first input/output expander 921, a second input/output expander 922, a third input/output expander 923, a fourth input/output expander 924, a fifth antenna 911, a sixth antenna 912, a seventh antenna 913, an eighth antenna 914, a ninth antenna 915, a tenth antenna 916, an eleventh antenna 917 and/or a twelfth antenna 918. The fifth antenna 911, the sixth antenna 912, the seventh antenna 913, the eighth antenna 914, the ninth antenna 915, the tenth antenna 916, the eleventh antenna 917, and/or the twelfth antenna 918 may be formed into a 2*4 multipolarized antenna array.

In various embodiments, the first input/output expander 921, the second input/output expander 922, the third input/output expander 923, and the fourth input/output expander 924 may include a rat-race coupler or a quadrature coupler.

In various embodiments, the fifth antenna 911, the sixth antenna 912, the seventh antenna 913, the eighth antenna 914, the ninth antenna 915, the tenth antenna 916, the eleventh antenna 917, and/or the twelfth antenna 918 may be patch antennas.

In various embodiments, the fifth antenna 911, the sixth antenna 912, the seventh antenna 913, the eighth antenna 914, the ninth antenna 915, the tenth antenna 916, the eleventh antenna 917, and the twelfth antenna 918 may each include two feeding points.

The first input/output expander 921 may receive signals through the seventh port 901 and the eleventh port 905 and transmit them to the fifth antenna 911 and the sixth antenna 912.

The second input/output expander 922 may receive signals through the eighth port 902 and the twelfth port 906 and transmit them to the seventh antenna 913 and the eighth antenna 914.

The third input/output expander 923 may receive a signal through the ninth port 903 and the thirteenth port 907 and transmit them to the ninth antenna 915 and the tenth antenna 916.

The fourth input/output expander 924 may receive signals through the tenth port 904 and the fourteenth port 908 and transmit them to the eleventh antenna 917 and the twelfth antenna 918.

The seventh port 901, the eighth port 902, the ninth port 903, and the tenth port 904 may receive the first input signal. The eleventh port 905, the twelfth port 906, the thirteenth port 907, and the fourteenth port 908 may receive a second input signal.

The fifth antenna 911, the sixth antenna 912, the seventh antenna 913, the eighth antenna 914, the ninth antenna 915, the tenth antenna 916, the eleventh antenna 917, and/or the twelfth antenna 918 may operate as a multipolar antenna of vertical polarization, horizontal polarization, left polarization, and right polarization by adjusting the phase of each of the first input signal and the second input signal.

In various embodiments, the operating mode of the array antenna output to the fifth antenna 911, the sixth antenna 912, the seventh antenna 913, the eighth antenna 914, the ninth antenna 915, the tenth antenna 916, the eleventh antenna 917, and/or the twelfth antenna 918 according to the first input signal input to the seventh port 901, the eighth port 902, the ninth port 903, and the tenth port 904 and the second input signal input to the eleventh port 905, the twelfth port 906, the thirteenth port 907, and the fourteenth port 908, may be shown in Table 2.

TABLE 2

| Port input combination | Antenna mode |
|---|---|
| $T = \begin{pmatrix} 0 \\ +\alpha \\ +2\alpha \\ +3\alpha \end{pmatrix}, B = T + 90\text{ deg}$ | V-pol(vertical polarization) + αsteering |
| $T = \begin{pmatrix} 0 \\ +\alpha \\ +2\alpha \\ +3\alpha \end{pmatrix}, B = T - 90\text{ deg}$ | H-pol(horizontal polarization) + αsteering |
| $T = \begin{pmatrix} 0 \\ +\alpha \\ +2\alpha \\ +3\alpha \end{pmatrix}, B\text{ signal off}$ | LHCP-pol(left polarization) + αsteering |

TABLE 2-continued

| Port input combination | Antenna mode |
|---|---|
| $T \text{ signal off}, B = \begin{pmatrix} 0 \\ +\alpha \\ +2\alpha \\ +3\alpha \end{pmatrix}$ | RHCP-pol(right polarization) + αsteering |

In Table 2, T may be the first input signal, and B may be the second input signal. The electronic device 101 may operate as a 2*4 multipolarized antenna array by applying values of +90°, −90°, and/or off state to the first and second input signals. For example, if the first input signal has values of T1=0, T2=+α, T3=+2α, and T4=+3α, and the second input signal B1 to B4 is at +90° with respect to the first input signal, it may be possible to perform beamforming with a vertical polarized signal +α.

Figure 10:
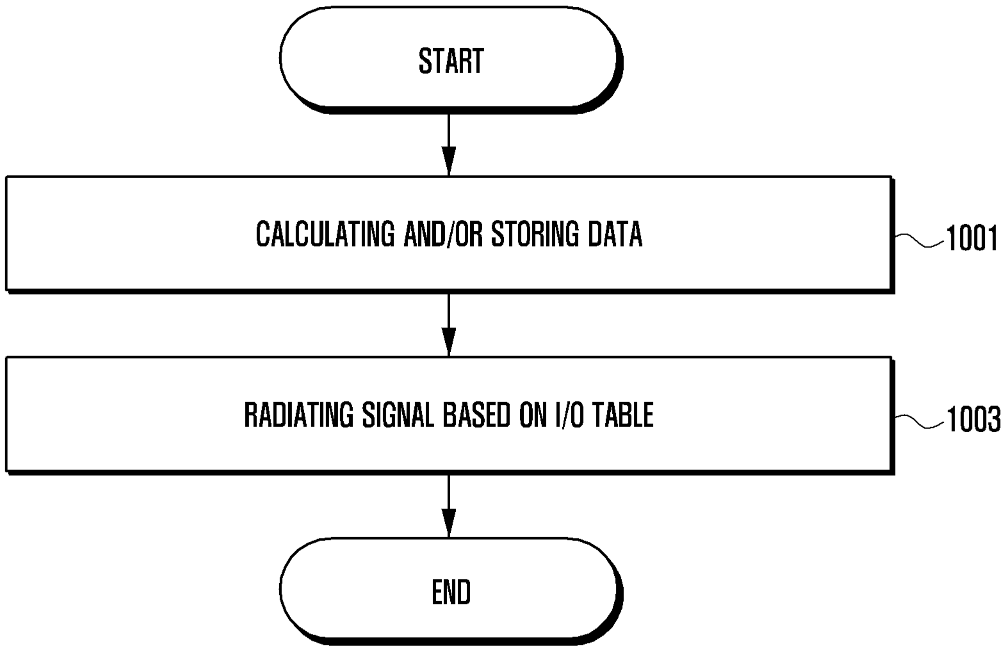
FIG. 10 is a flowchart illustrating an example antenna control method of an example electronic device according to various embodiments.

FIG. 10 is a flowchart illustrating an example antenna control operation of an example electronic device 101 according to various embodiments of the present disclosure.

The electronic device 101, under the control of the processor 220, may calculate and/or store data in operation 1001.

In various embodiments, the electronic device 101 may store data in the memory 130 at operation 1001, under the control of the processor 220. The data stored in the memory 130 may be an input/output table representing an output signal for the input signal of the input/output expander 230.

In various embodiments, since the input/output expander 230 is a passive device, the electronic device 101 may store the operation of the output signal for the input signal with respect to the input/output expander 230 as data. For example, data may be stored at the time of manufacture of the electronic device 101. In various embodiments, data may be received through the communication module 190 of the electronic device 101 and stored in the memory 130.

In various embodiments, the electronic device 101, in operation 1001 under the control of the processor 220, may combine the magnitude and frequency phase state of the RF signal input to the input/output expander 230, calculate the RF signal that can be output from the input/output expander 230, and store the calculated data in the memory 130.

The electronic device 101, in operation 1003 under the control of the processor 220, may radiate or receive an RF signal through an antenna based on the input/output table.

In various embodiments, the electronic device 101, in operation 1003 under the control of the processor 220, may radiate an RF signal by steering a phased array beam of the RF signal based on the input/output table.

In various embodiments, the electronic device 101, in operation 1003 under the control of the processor 220, may radiate an RF signal by determining the polarization of the RF signal based on the input/output table.

An electronic device according to an embodiment of the disclosure may be one of various types of electronic devices. The electronic devices may include a portable communication device (e.g., a smartphone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and are intended to include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" refers to the storage medium being a tangible device, and does not include a signal (e.g., an electromagnetic wave), but this term does not differentiate between data being semi-permanently stored in the storage medium and data being temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

memory;

at least one processor comprising processing circuitry;

a communication circuit;

an input/output (I/O) expander; and an array antenna, wherein the I/O expander comprises a plurality of dividers and a plurality of couplers cross-arranged in a chain structure, and the memory stores an I/O table and the at least one processor is configured to control the electronic device to radiate an RF signal through the array antenna via the I/O expander based on the I/O table.

2. The electronic device of claim 1, wherein the at least one processor is configured to control the electronic device to calculate an RF signal for output from the I/O expander by combining a magnitude and frequency phase state of an RF signal input to the I/O expander.

3. The electronic device of claim 1, wherein the at least one processor is configured to control the electronic device to radiate an RF signal by steering a phased array beam of the RF signal based on the I/O table.

4. The electronic device of claim 1, wherein the at least one processor is configured to control the electronic device to radiate an RF signal by controlling a polarization of the RF signal based on the I/O table.

5. The electronic device of claim 1, wherein the communication circuit comprises an integrated circuit (IC) configured to steer a phased array beam or an IC configured to control an RF signal polarization.

6. The electronic device of claim 1, wherein each of the plurality of couplers comprises a rat-race coupler or a quadrature coupler.

7. The electronic device of claim 1, wherein the I/O expander comprises:

a first divider;

a second divider;

a first coupler; and a second coupler, wherein the first coupler and the second coupler are connected between the first divider and the second divider.

8. The electronic device of claim 7, wherein the first divider and the second divider comprise one input port and two output ports.

9. The electronic device of claim 8, wherein the communication circuit is connected to the input port of the first divider and the second divider.

10. The electronic device of claim 8, wherein the array antenna is connected to a respective output port of each of the first coupler and the second coupler.

11. The electronic device of claim 1, wherein the I/O table stores relationships between an RF signal at an input of the I/O expander and RF signals at outputs of the I/O expander.

12. A method of controlling an electronic device including at least one processor comprising processing circuitry, an input/output (I/O) expander, and memory, the method comprising:

storing an input/output (I/O) table in the memory; and radiating an RF signal through an antenna via the I/O expander based on the I/O table, wherein the I/O expander comprises a plurality of dividers and a plurality of couplers cross-arranged in a chain structure, each of the plurality of couplers comprising two input ports and two output ports.

13. The method of claim 12, further comprising calculating an RF signal for output from the I/O expander by combining a magnitude and frequency phase state of an RF signal input to the I/O expander.

14. The method of claim 12, further comprising radiating an RF signal by steering a phased array beam of an RF signal based on the I/O table.

15. The method of claim 12, further comprising radiating an RF signal by controlling a polarization of the RF signal based on the I/O table.

* * * * *